United States Patent
Zeiner et al.

(10) Patent No.: US 9,845,734 B2
(45) Date of Patent: Dec. 19, 2017

(54) AIR TURBINE START SYSTEM WITH MONOPOLE STARTER AIR VALVE POSITION

(75) Inventors: Peter Kenneth Zeiner, Scottsdale, AZ (US); Dave Oman, Chandler, AZ (US); Jimmy Wiggins, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2008 days.

(21) Appl. No.: 13/090,905

(22) Filed: Apr. 20, 2011

(65) Prior Publication Data

US 2012/0266606 A1  Oct. 25, 2012

(51) Int. Cl.
| | | |
|---|---|---|
| *F02C 7/277* | (2006.01) | |
| *F01D 19/00* | (2006.01) | |
| *F01D 17/06* | (2006.01) | |

(52) U.S. Cl.
CPC ............. *F02C 7/277* (2013.01); *F01D 17/06* (2013.01); *F01D 19/00* (2013.01); *F05D 2260/40311* (2013.01); *F05D 2260/85* (2013.01); *F05D 2270/304* (2013.01); *F05D 2270/44* (2013.01); *F05D 2270/54* (2013.01); *F05D 2270/65* (2013.01)

(58) Field of Classification Search
CPC .......... F01D 17/06; F01D 19/00; F01D 21/02; F05D 2260/85; F05D 2270/304; F05D 2270/44; F05D 2270/54; F05D 2270/65; F05D 2260/40311; F02C 7/277
USPC .......................................................... 415/30
See application file for complete search history.

(56) References Cited

U.S. PATENT DOCUMENTS

| | | | | |
|---|---|---|---|---|
| 3,284,668 A | * | 11/1966 | Heaslip | ......................... 361/239 |
| 3,521,505 A | * | 7/1970 | Sebring | ............................. 475/6 |
| 3,812,378 A | * | 5/1974 | Coman | ........................ 290/38 R |
| 3,946,364 A | | 3/1976 | Codomo et al. | |
| 4,028,536 A | | 6/1977 | Woodward | |
| 4,723,518 A | | 2/1988 | Kawasaki et al. | |
| 4,763,285 A | | 8/1988 | Moore et al. | |
| 4,787,053 A | | 11/1988 | Moore | |
| 4,788,531 A | | 11/1988 | Corwin et al. | |

(Continued)

FOREIGN PATENT DOCUMENTS

| | | |
|---|---|---|
| EP | 0021881 A1 | 1/1918 |
| EP | 0322158 A2 | 12/1988 |

(Continued)

OTHER PUBLICATIONS

PCT Search Report, PCT/US2004/032651 dated Oct. 18, 2005.

*Primary Examiner* — Dwayne J White
*Assistant Examiner* — Adam W Brown
(74) *Attorney, Agent, or Firm* — Lorenz & Kopf, LLP

(57) ABSTRACT

An air turbine start system is provided that includes an air turbine starter, a starter air valve, a turbine speed sensor, and a circuit. The starter air valve is movable between an open position, in which the pressurized air may flow into the air turbine starter, and a closed position, in which pressurized air does not flow into the air turbine starter. The turbine speed sensor is coupled to the air turbine starter, and is configured to sense the rotational speed of the turbine and supply a rotational speed signal representative thereof. The circuit is coupled to receive the rotational speed signal and is configured, upon receipt thereof, to determine whether the starter air valve is in the closed position or an open position.

20 Claims, 2 Drawing Sheets

(56) References Cited

U.S. PATENT DOCUMENTS

| | | |
|---|---|---|
| 4,908,775 A | 3/1990 | Palusamy et al. |
| 4,964,125 A | 10/1990 | Kim |
| 5,033,010 A | 7/1991 | Lawrence et al. |
| 5,042,963 A | 8/1991 | Sorenson et al. |
| 5,050,081 A | 9/1991 | Abbott et al. |
| 5,079,707 A | 1/1992 | Bird et al. |
| 5,127,220 A * | 7/1992 | Jesrai et al. .......... 60/778 |
| 5,260,874 A | 11/1993 | Berner et al. |
| 5,331,559 A * | 7/1994 | High et al. .......... 701/100 |
| 5,435,125 A * | 7/1995 | Telakowski .......... 60/788 |
| 5,500,797 A | 3/1996 | Noger |
| 5,666,111 A | 9/1997 | Servat et al. |
| 5,671,141 A | 9/1997 | Smith et al. |
| 5,816,530 A | 10/1998 | Grube |
| 6,115,656 A | 9/2000 | Sudolsky |
| 6,122,575 A | 9/2000 | Schmidt et al. |
| 6,295,488 B1 | 9/2001 | Longere |
| 6,408,258 B1 | 6/2002 | Richer |
| 6,688,308 B1 | 2/2004 | Phillips et al. |
| 6,744,401 B2 | 6/2004 | Hager et al. |
| 6,965,816 B2 | 11/2005 | Walker |
| 2002/0016654 A1 | 2/2002 | Ing et al. |
| 2002/0035416 A1 | 3/2002 | De Leon |
| 2003/0093187 A1 | 5/2003 | Walker |
| 2003/0144969 A1 | 7/2003 | Coyne |
| 2004/0106404 A1 | 6/2004 | Gould et al. |
| 2005/0075769 A1 | 4/2005 | Eschborn et al. |
| 2007/0089420 A1 * | 4/2007 | Klingels .......... 60/772 |

FOREIGN PATENT DOCUMENTS

| | | |
|---|---|---|
| EP | 1280316 A2 | 1/2003 |
| EP | 1280316 A3 | 10/2003 |
| EP | 1426870 A2 | 6/2004 |
| WO | 0208057 A1 | 1/2002 |
| WO | 03056284 A2 | 7/2003 |

\* cited by examiner

AIR TURBINE START SYSTEM WITH MONOPOLE STARTER AIR VALVE POSITION

TECHNICAL FIELD

The present invention generally relates to air turbine start systems (ATSs), and more particularly relates to an air turbine start system that uses a monopole for valve position determination and health monitoring.

BACKGROUND

Many relatively large gas turbine engines, including turbofan jet engines, may use an air turbine starter (ATS) to initiate turbine engine rotation. The ATS may be mounted by the engine, much as a starter for an automobile is located by the automobile engine. The ATS may be coupled to a high pressure fluid source, such as compressed air, which impinges upon a turbine in the ATS causing it to rotate at a relatively high rate of speed. The ATS includes an output shaft that is coupled to the turbine and, via one or more gears, to the gas turbine engine. The output shaft thus rotates with the turbine. This rotation in turn causes the gas turbine engine to begin rotating.

The flow of compressed air to an ATS may be controlled by, for example, a valve. This valve, if included, is typically referred to as a starter air valve (SAV), and may be controllably moved between a closed position and an open position via a signal supplied from an engine control, such as a full-authority digital engine control (FADEC). When the starter air valve is in the open position, compressed air may flow through the starter air valve, and into the ATS. Conversely, when the starter valve is in the closed position, compressed air flow to the ATS may be prevented. Uncontrolled air flow to the ATS may result in damage to either the ATS or engine gearbox.

Many ATSs presently sense SAV position using a position indication switch or pressure transducer. Both of these types of devices provide either a SAV "closed" indication or a "not closed" indication. These types of devices exhibit certain drawbacks. For example, position indication switches can exhibit relatively low reliability, and pressure transducers, while relatively reliable, are relatively high in cost. Reliable position indication is desirable to prevent damage to the ATS or engine gearbox.

Hence, there is a need for a device that can sense SAV position that both exhibits relatively high reliability and a relatively low cost. The present invention addresses at least this need.

BRIEF SUMMARY

In one embodiment, an air turbine start system includes an air turbine starter, a starter air valve, a turbine speed sensor, and a circuit. The air turbine starter includes a rotationally mounted turbine. The air turbine starter is adapted to receive pressurized air and is configured, upon receipt of the pressurized air, to direct the pressurized air into the turbine to thereby cause the turbine to rotate at a rotational speed. The starter air valve is in fluid communication with the air turbine starter and is movable between an open position, in which the pressurized air may flow into the air turbine starter, and a closed position, in which pressurized air does not flow into the air turbine starter. The turbine speed sensor is coupled to the air turbine starter. The turbine speed sensor is configured to sense the rotational speed of the turbine and supply a rotational speed signal representative thereof. The circuit is coupled to receive the rotational speed signal and is configured, upon receipt thereof, to determine whether the starter air valve is in the closed position or an open position.

In another embodiment, a gas turbine engine system includes a gas turbine engine, an air turbine starter, a starter air valve, a monopole sensor, and a circuit. The air turbine starter is coupled to the gas turbine engine and includes a rotationally mounted turbine. The air turbine starter is adapted to receive pressurized air and is configured, upon receipt of the pressurized air, to direct the pressurized air into the turbine to thereby cause the turbine to rotate at a rotational speed. The starter air valve is in fluid communication with the air turbine starter and is movable between an open position, in which the pressurized air may flow into the air turbine starter, and a closed position, in which pressurized air does not flow into the air turbine starter. The monopole sensor is coupled to the air turbine starter, and is configured to sense the rotational speed of the turbine and supply a rotational speed signal representative thereof. The circuit is coupled to receive the rotational speed signal and is configured, upon receipt thereof, to determine whether the starter air valve is in the closed position or an open position.

In another embodiment, an air turbine start system includes an air turbine starter, a starter air valve, a monopole sensor, and a circuit. The air turbine starter includes a rotationally mounted turbine. The air turbine starter is adapted to receive pressurized air and is configured, upon receipt of the pressurized air, to direct the pressurized air into the turbine to thereby cause the turbine to rotate at a rotational speed. The starter air valve is in fluid communication with the air turbine starter and is movable between an open position, in which the pressurized air may flow into the air turbine starter, and a closed position, in which pressurized air does not flow into the air turbine starter. The monopole sensor is coupled to the air turbine starter, and is configured to sense the rotational speed of the turbine and supply a rotational speed signal representative thereof. The circuit is coupled to receive the rotational speed signal and is configured, upon receipt thereof, to determine whether the starter air valve is in the closed position or an open position, determine if the air turbine starter is being back-driven, and control pressurized air flow to the air turbine starter, to thereby control turbine acceleration rate and speed.

Furthermore, other desirable features and characteristics of the air turbine start system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
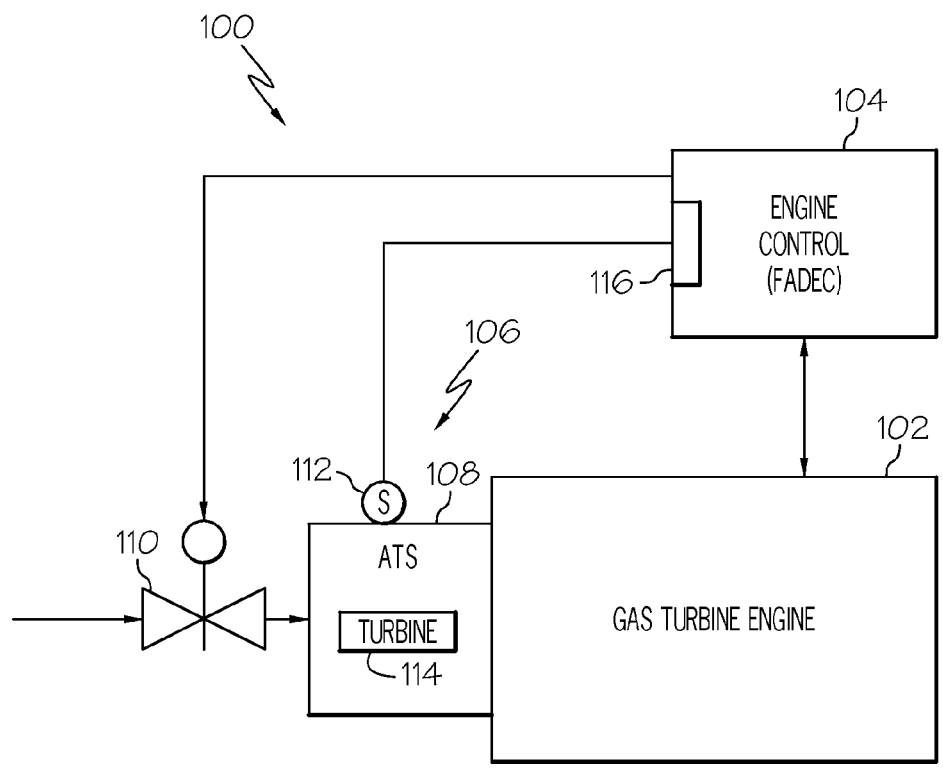
FIG. 1 depicts a functional block diagram of an exemplary embodiment of a portion of a gas turbine engine system.

Referring first to FIG. 1, a functional block diagram of an exemplary embodiment of a portion of a gas turbine engine system 100 is depicted, and includes a gas turbine engine 102, an engine control 104, and an air turbine start system 106. The gas turbine engine 102, which may be implemented using any one of numerous gas turbine engines now known or developed in the future, is coupled to receive a flow of fuel from a non-illustrated fuel source and, in response to various signals from the engine control 104, to ignite the fuel and generate a torque.

The engine control 104 is coupled to the gas turbine engine 102 and the air turbine start system 106. The engine control 104 is configured to, among other things, control the supply of fuel to the gas turbine engine 102, and to control portions of the air turbine start system 106. The engine control 104 may be variously implemented. In the depicted embodiment, it is implemented using a full-authority digital engine control (FADEC).

Figure 2:
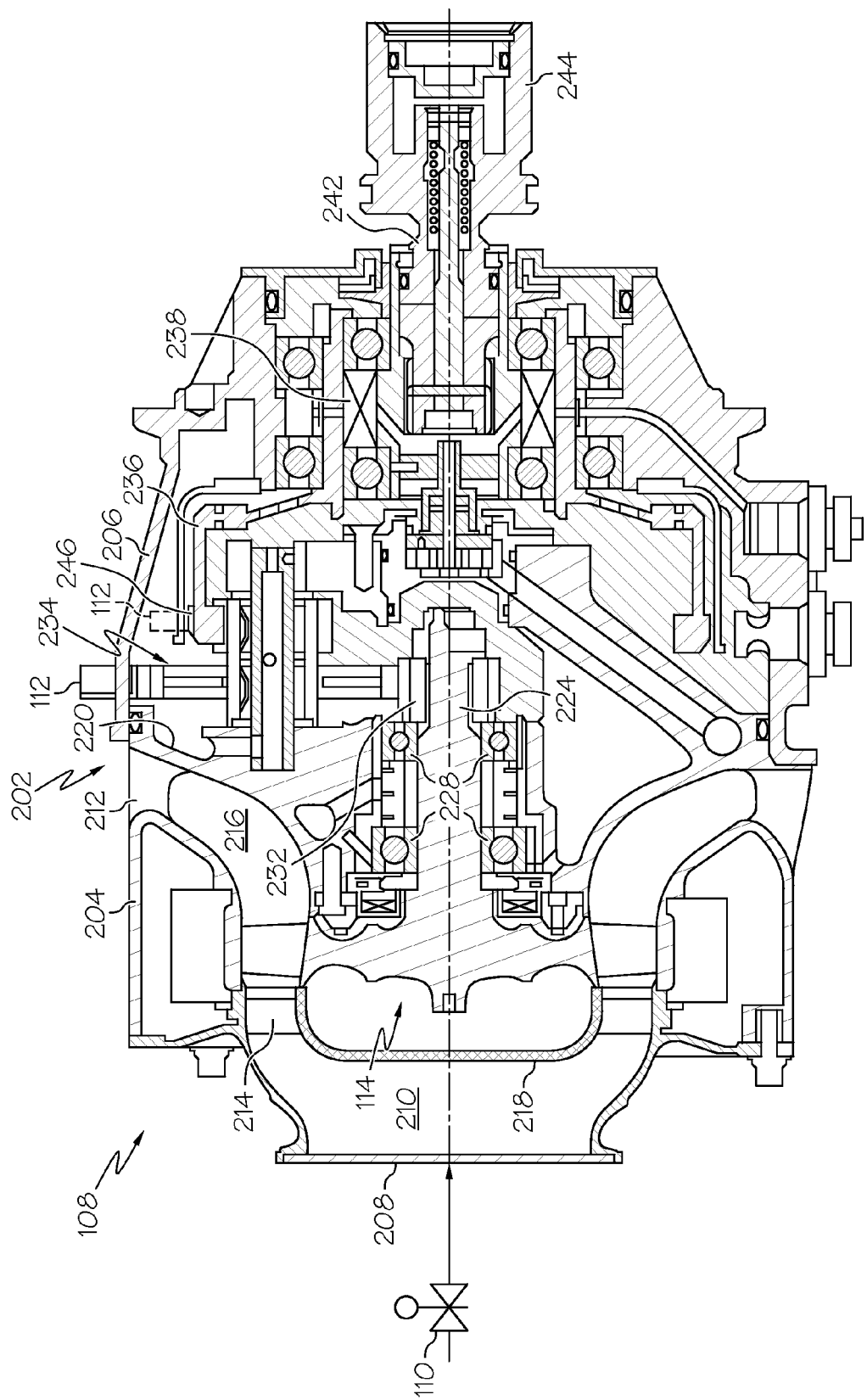
FIG. 2 depicts a cross section view of one exemplary embodiment of an air turbine starter.

The air turbine start system 106 includes an air turbine starter (ATS) 108, a start air valve (SAV) 110, and a speed sensor 112. The ATS 108 is coupled to the gas turbine engine 102, and includes a rotationally mounted turbine 114. The ATS 108 is coupled to selectively receive, via the SAV 110, a flow of pressurized air from a non-illustrated compressed air source. The ATS 108 is configured, upon receipt of the pressurized air, to direct the pressurized air into the turbine 114. The pressurized air impinges upon the turbine 114, causing it to rotate at a rotational speed. The ATS 108 is coupled to, and thus rotates the gas turbine engine 102. It will be appreciated that the ATS 108 may be variously configured. For completeness, a cross section view of one exemplary embodiment of an ATS 108 is depicted in FIG. 2, and with reference thereto will now be described.

The depicted ATS 108 includes a housing assembly 202 that is used to house various components. The housing assembly 202 may be made up of two or more parts that are combined together or may be integrally formed as a single piece. In the depicted embodiment, the housing assembly is made up of a turbine section 204 and an output section 206. The housing assembly turbine section 204 includes an inlet plenum 208, which directs the pressurized air from the pressurized air source (not illustrated) into the housing assembly 202, via the SAV 110, which, for ease of illustration, is depicted schematically in FIG. 2. It will be appreciated that the pressurized air source may be any one of numerous known sources for supplying pressurized air to an ATS 108. For example, the non-illustrated pressurized air source could be an auxiliary power unit, bleed air from another operating gas turbine engine, or a gas turbine ground power cart.

When pressurized air is supplied to the ATS 108, the pressurized air enters the inlet plenum 208, flows through an annular flow channel 210, and exits the ATS 108 via a radial outlet port 212. The annular flow channel 210 includes an axial flow portion 214 and a substantially curved flow portion 216. The axial flow portion 214 is formed through a stator assembly 218 that is mounted within the housing assembly turbine section 204 proximate the inlet plenum 208. The radial flow portion 216, which flares the annular flow channel 210 radially outwardly, is formed between a portion of the housing assembly turbine section 104 and an exhaust housing 220 that is mounted within the housing assembly 202.

The turbine 114 is rotationally mounted within the housing assembly turbine section 204, and includes an output shaft 224, that extends through the exhaust housing 220, and into the housing assembly output section 206. The output shaft 224 is rotationally mounted in the housing assembly output section 206 by bearing assemblies 228. The output shaft 224 is coupled, via an output gear 232, to a plurality of gears. In the depicted embodiment, these gears include a planetary gear set 234 and a ring gear 236. In particular, the output gear or sun gear 232 meshes with the planetary gear set 234, which in turn engages the ring gear 236.

The ring gear 236 is coupled to an overrunning clutch 238. A drive shaft 242 extends from the overrunning clutch 238, through the turbine housing output section 206, and is coupled to an output shaft 244. The output shaft 244 is in turn coupled to the gas turbine engine 102. The overrunning clutch 238 disengages the turbine 114 and gears from the output shaft 244, and prevents the turbine 114 from being back-driven at the speed of the gas turbine engine 102.

Returning now to FIG. 1, the SAV 110 is in fluid communication with the ATS 108 and is movable between an open position and a closed position. The position of the SAV 110 is controlled via a valve position signal supplied by the engine control 104. When the SAV 110 is commanded to the open position, the non-illustrated compressed air source is in fluid communication with the ATS 108, and pressurized air may flow into the ATS 108. Conversely, when the SAV 110 is commanded to the closed position, the non-illustrated compressed air source is isolated from the ATS 108, and pressurized air does not flow into the ATS 108.

Figure 3:
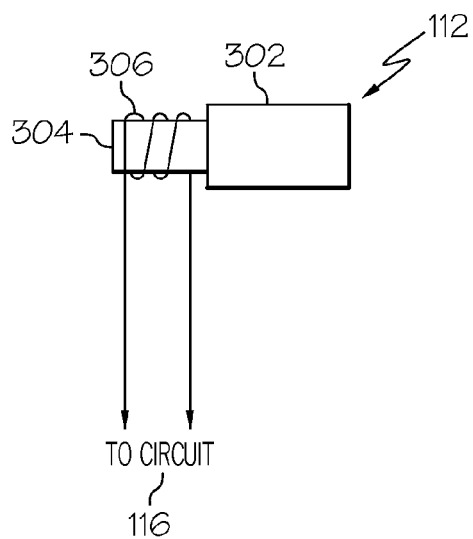
FIG. 3 depicts a schematic representation of an exemplary embodiment of a monopole sensor.

The speed sensor 112 is coupled to the ATS 108 and is configured to sense the rotational speed of the turbine 114 and supply a rotational speed signal representative thereof to a circuit 116. The speed sensor 112 may be variously implemented, but in a particular embodiment it is implemented using a monopole sensor 112. Although the monopole sensor 112 may be variously configured, in one exemplary embodiment, which is depicted in FIG. 3, it includes a permanent magnet 302 having a pole piece 304 extending therefrom, and a coil 306 that is disposed around the pole piece 304. The pole piece 304 may be disposed proximate a rotatable component that is formed, at least partially of a magnetically permeable material, such as a ferromagnetic material. When the component rotates, a voltage of varying amplitude is induced in the coil 306. The frequency of the voltage variation is proportional to, and may thus be used to determine, the rotational rate of the device.

The speed sensor 112 may be coupled to the ATS 108 at any one of numerous places to sense the rotational rate of any one of numerous rotating components within the ATS 108. In the depicted embodiment, and with quick reference back to FIG. 2, the speed sensor 112 may be coupled to the housing assembly 102 or another structure internal to the housing assembly 102, and disposed proximate the planet gear set 234 or, as depicted in phantom in FIG. 2, the ring gear 236. If it is disposed proximate the planet gear set 234, the speed sensor 112 will sense turbine rotational speed via the gear teeth on the planet gear set 234. If it is disposed proximate the ring gear 236, the speed sensor 112 will sense turbine rotational speed via a feature 246 that may be formed on the ring gear 236.

Returning once again to FIG. 1, the circuit 116 is coupled to receive the rotational speed signal. Although the circuit 116 is depicted in FIG. 1 as being disposed within the engine control 104, it may also be disposed separate from the engine control 104. No matter its specific location, the circuit 116 is configured, upon receipt of the rotational speed signal, to at least determine whether the SAV 110 is in the closed position or an open (e.g., "not closed") position. In particular, the circuit 116 is configured to determine the rotational speed of the turbine 114 and compare this speed to a preset threshold speed. If the determined rotational speed is at or above the preset threshold speed, this may indicate that pressurized air is continuing to flow into the ATS 108 and causing the turbine 114 to rotate, thus indicating that the SAV 110 is in an open position. Conversely, if the determined rotational speed is below the preset speed threshold, this indicates that pressurized air is not flowing into the ATS 108, thus indicating that the SAV 110 is closed.

In some embodiments, the circuit 116 may also be configured, in response to the rotational speed signal, to determine if one or more faults have occurred within the ATS 108. For example, the circuit 116 may be configured to determine that the ATS 108 is being back-driven, indicating that the clutch 238 may not have disengaged the output shaft 244 from the remainder of the ATS 108. The circuit 116 may do so, for example, by comparing the rotational speed of the turbine 114 to the rotational speed of the gas turbine engine 102. If the two speeds are equal, or at least substantially equal, this likely indicates that the ATS 108 is being back-driven by the gas turbine engine 102.

In some embodiments, the rotational speed signal may also be used by the engine control 104 to control ATS 108 acceleration rate and speed. In particular, the engine control 104 may implement logic to controllably modulate the position of the SAV 110, and thus the flow of pressurized air to the ATS 108, to control acceleration rate and speed. By controlling acceleration rate, ATS impact torque during a running engagement start can be minimized, which can protect both the gas turbine engine 102 and the ATS 108 from over-torque. By controlling speed, extended operation at turbine resonance conditions can be avoided.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An air turbine start system, comprising:
    an air turbine starter comprising a rotationally mounted turbine, the air turbine starter adapted to receive pressurized air and configured, upon receipt of the pressurized air, to direct the pressurized air into the turbine to thereby cause the turbine to rotate at a rotational speed;
    a starter air valve in fluid communication with the air turbine starter and movable between an open position, in which the pressurized air may flow into the air turbine starter, and a closed position, in which pressurized air does not flow into the air turbine starter;
    a turbine speed sensor coupled to the air turbine starter, the turbine speed sensor configured to sense the rotational speed of the turbine and supply a rotational speed signal representative thereof; and
    a circuit coupled to receive the rotational speed signal and configured, upon receipt thereof, to determine whether the starter air valve is in the closed position or an open position.

2. The system of claim 1, wherein the turbine speed sensor comprises a monopole sensor.

3. The system of claim 2, wherein:
    the air turbine starter further comprises a plurality of gears coupled to the turbine; and
    the monopole sensor is disposed adjacent at least one of the plurality of gears.

4. The system of claim 3, wherein:
    the plurality of gears comprises a planet gear set; and
    the monopole sensor is disposed adjacent the planet gear set.

5. The system of claim 3, wherein:
    the plurality of gears comprises a ring gear; and
    the monopole sensor is disposed adjacent the ring gear.

6. The system of claim 1, wherein:
    the air turbine starter is further adapted to be coupled to a gas turbine engine; and
    the circuit is further configured, upon receipt of the rotational speed signal, to determine if the air turbine starter is being back-driven by the gas turbine engine.

7. The system of claim 1, wherein the circuit is further configured, in response to the rotational speed signal, to control pressurized air flow to the air turbine starter, to thereby control turbine acceleration rate and speed.

8. The system of claim 1, further comprising a gas turbine engine coupled to the air turbine starter.

9. The system of claim 8, further comprising:
    an engine control configured to control operations of the gas turbine engine,
    wherein the circuit is disposed within the engine control.

10. A gas turbine engine system, comprising:
    a gas turbine engine;
    an air turbine starter coupled to the gas turbine engine and comprising a rotationally mounted turbine, the air turbine starter adapted to receive pressurized air and configured, upon receipt of the pressurized air, to direct the pressurized air into the turbine to thereby cause the turbine to rotate at a rotational speed;
    a starter air valve in fluid communication with the air turbine starter and movable between an open position, in which the pressurized air may flow into the air turbine starter, and a closed position, in which pressurized air does not flow into the air turbine starter;
    a monopole sensor coupled to the air turbine starter, the monopole sensor configured to sense the rotational speed of the turbine and supply a rotational speed signal representative thereof; and
    a circuit coupled to receive the rotational speed signal and configured, upon receipt thereof, to determine whether the starter air valve is in the closed position or an open position.

11. The system of claim 10, wherein:
    the air turbine starter further comprises a plurality of gears coupled to the turbine; and
    the monopole sensor is disposed adjacent at least one of the plurality of gears.

12. The system of claim 11, wherein:
the plurality of gears comprises a planet gear set; and
the monopole sensor is disposed adjacent the planet gear set.

13. The system of claim 11, wherein:
the plurality of gears comprises a ring gear; and
the monopole sensor is disposed adjacent the ring gear.

14. The system of claim 10, wherein the circuit is further configured, upon receipt of the rotational speed signal, to determine if the air turbine starter is being back-driven by the gas turbine engine.

15. The system of claim 10, wherein the circuit is further configured, in response to the rotational speed signal, to control pressurized air flow to the air turbine starter, to thereby control turbine acceleration rate and speed.

16. The system of claim 10, further comprising:
an engine control configured to control operations of the gas turbine engine,
wherein the circuit is disposed within the engine control.

17. An air turbine start system, comprising:
an air turbine starter comprising a rotationally mounted turbine, the air turbine starter adapted to receive pressurized air and configured, upon receipt of the pressurized air, to direct the pressurized air into the turbine to thereby cause the turbine to rotate at a rotational speed;
a starter air valve in fluid communication with the air turbine starter and movable between an open position, in which the pressurized air may flow into the air turbine starter, and a closed position, in which pressurized air does not flow into the air turbine starter;
a monopole sensor coupled to the air turbine starter, the monopole sensor configured to sense the rotational speed of the turbine and supply a rotational speed signal representative thereof; and
a circuit coupled to receive the rotational speed signal and configured, upon receipt thereof, to:
  (i) determine whether the starter air valve is in the closed position or an open position,
  (ii) determine if the air turbine starter is being back-driven, and
  (iii) control pressurized air flow to the air turbine starter, to thereby control turbine acceleration rate and speed.

18. The system of claim 17, wherein:
the air turbine starter further comprises a plurality of gears coupled to the turbine; and
the monopole sensor is disposed adjacent at least one of the plurality of gears.

19. The system of claim 18, wherein:
the plurality of gears comprises a planet gear set; and
the monopole sensor is disposed adjacent the planet gear set.

20. The system of claim 18, wherein:
the plurality of gears comprises a ring gear; and
the monopole sensor is disposed adjacent the ring gear.

* * * * *